Nov. 16, 1926.
A. C. DURDIN, JR
1,607,247
SEWAGE PUMPING APPARATUS
Filed August 2, 1926
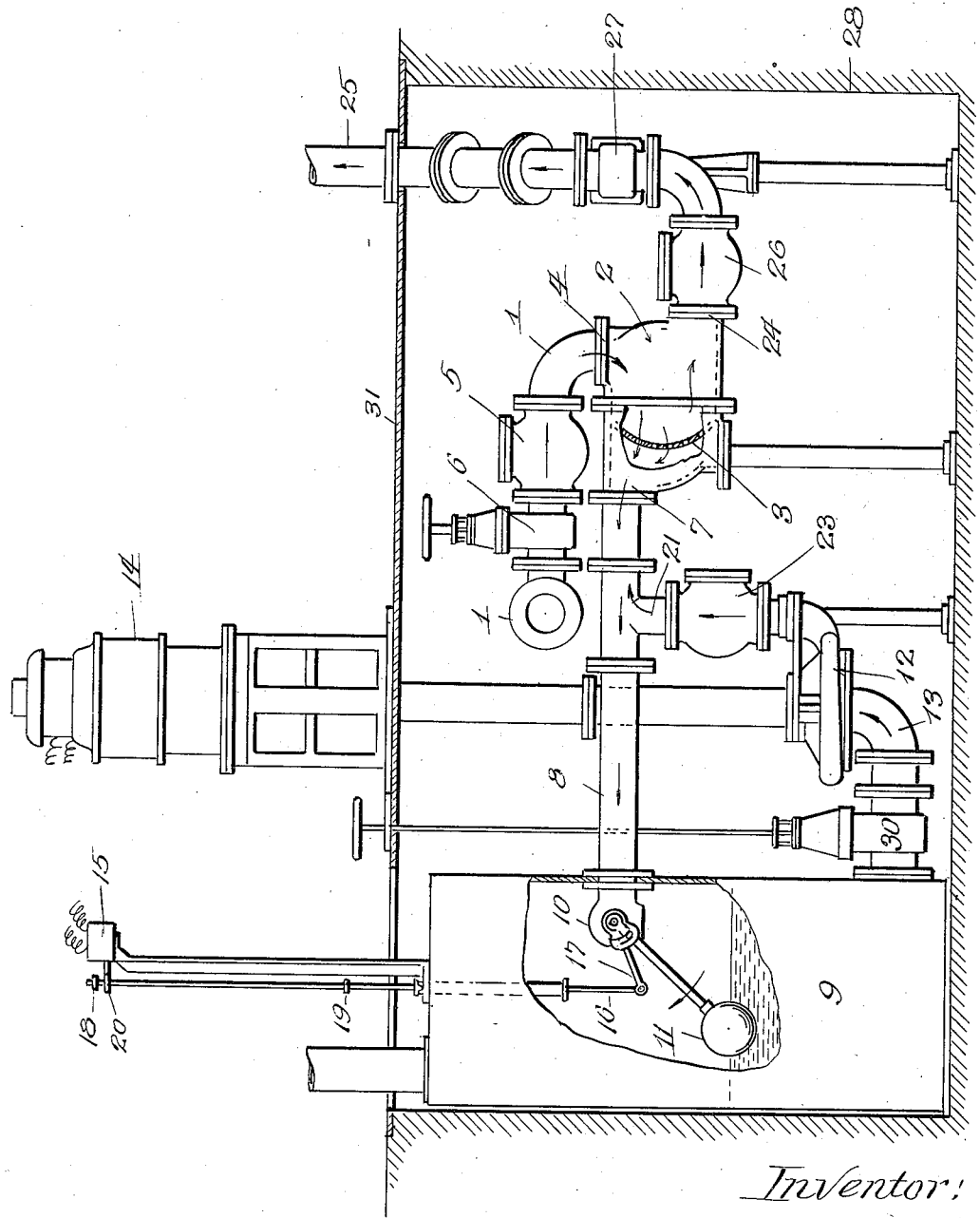
Inventor:
Augustus C. Durdin, Jr.,
by Charles O. Shurvey
his Atty Patented Nov. 16, 1926.

1,607,247

UNITED STATES PATENT OFFICE.

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS.

SEWAGE-PUMPING APPARATUS.

Application filed August 2, 1926. Serial No. 126,498.

This invention relates to sewage pumping apparatus, more particularly to means whereby sewage or other liquid containing more or less solid foreign matter may be disposed of as rapidly as it accumulates. A pump is usually employed for raising the sewage to a higher level than its source and one object of the present invention is to provide an improved separating device, strainer or screening device for preventing the more or less solid substances from entering the pump and clogging the same, or perhaps causing serious danger thereto. Another object is to provide an apparatus in which the strained liquid is collected in a chamber or tank and used for removing the accumulated matter from the separating device or screen and thereby keeping it clean and free to operate for the purpose for which it is intended.

With these and other objects and advantages in view, this invention consists in a pumping apparatus in which the incoming liquid passes through a separator, strainer or screening device and collects in a chamber or tank, the accumulation of the liquid serving to set in operation a pump which discharges the liquid from the chamber and through the separating device or screening device thereby cleaning it. It further consists in pumping apparatus of this character which is automatic in operation and requires only the ordinary care of an attendant to keep it in condition. It further consists in the several novel features of construction, arrangement and combination of parts hereinafter fully set forth and claimed.

The invention is clearly illustrated in the drawing accompanying this specification, in which the figure is a view, partly in side elevation and partly in vertical section of sewage pumping apparatus embodying a simple form of the present invention.

Referring to said drawing, which is illustrative of a simple form of the invention, the reference character 1 designates the inlet pipe, which may be connected to the discharge end of the sewage system or other liquid source which is to be handled. The inlet pipe 1 discharges into a separator or screening device 2, which is provided with suitable means for separating, straining or screening out the more or less solid substance from the liquids, and it is here shown as provided with a screen 3 through which the liquid may pass, but which intercepts or restrains the more or less solid matters. The inlet pipe 1 discharges into the inlet 4 of the separating or screening device, and said pipe 1, contains a check valve 5, which opens in a direction to permit the flow to move towards the separator or screening device, and if desired a valve 6 may be interposed in the inlet pipe 1 ahead of the check valve 5 whereby the apparatus may be shut off from the sewage system.

An outlet 7 is provided on the separator or screening device 2 on the side of the screen 3 opposite the one on which the inlet 4 is located and from said outlet 7 leads a pipe 8 which empties into a chamber 9 such as a reservoir or tank, through a valve 10, which in the present instance is in the form of a float valve having a float 11, which closes the valve when the float is moved upward. The arrangement of the valve mechanism is preferably such that the float may move through a limited extent before it actuates the valve whereby the valve may remain closed during the lifting of the float from one predetermined low level to another predetermined high level, and may remain open until the liquid reaches the low level in the chamber.

Connected to the chamber 9 as by the discharge pipe 13 is a motor operated pump 12, preferably connected to and driven by an electric motor 14. A switch 15 is provided for the motor, which switch is controlled by the volume of liquid in the chamber 9, and as shown is provided with a switch actuating rod 16 that is connected to an arm 17 which is operated by the float 11. Buttons 18, 19 on the switch actuating rod 16 are arranged to engage with and operate the switch lever 20. The arrangement of these parts is such that when the liquid in the chamber is at the low level the switch is open, but when it reaches the high level the switch is closed and the motor 14 is set in operation, thereby driving the pump 12 and discharging liquid from the chamber 9. The discharge end of the pump 12 connects with the pipe 8 through a discharge pipe 21 in which is interposed a check valve 23 that opens outwardly from the pump. The pipe 8, chamber 9 and pipe 13 form a conduit leading from the outlet 7 of the separator to the pump.

The separating or screening device 2 is provided with a discharge opening 24 which connects with the discharge pipe 25, and an outwardly opening check valve 26 is preferably interposed between the separating or screening device 2 and the discharge pipe 25. Said pipe 25 may also contain a valve 27 whereby the apparatus may be shut off from the discharge system. A valve 30 may be provided in the pipe 13 for shutting the pump off from the chamber 9.

Most of the apparatus may be contained in a pit 28 located below the source from which the sewage is received and the discharge pipe 25 may lead to a sewer or other place where the sewage is to be disposed of. A lid or cover 31 closes the pit and may form the support for the pump motor.

In the operation of the apparatus, the sewage enters through the inlet pipe 1 and passes into the separator or screening device 2, where the more or less solid substances are intercepted, the liquid passing through the separator or screening device and discharging through the pipe 8 into the chamber 9. During this part of the operation of the device the motor and pump are stationary, and as the level of the liquid rises to the predetermined height it lifts the float 11, closes the valve 10 and closes the circuit to the motor through the switch 15, thereby setting the pump 12 in operation. The pump thereupon pumps the water out of the chamber 9, discharges it into the pipe 8, but because of the fact that the valve 10 is closed, the water passes into the separator or straining device 2 in a direction opposite to that in which it formerly passed through said device, thereby freeing the screen or other strainer 3 from the accumulated foreign matter and discharging the contents through the discharge pipe 25. When the low level of the water is reached in the chamber 9, the switch is opened and the pump stopped. The screened liquid thereupon flows to the chamber 9 and the operation is performed as before. This intermittent action is carried on indefinitely.

It is to be observed that with this apparatus, the incoming liquid does not flow through the pump because of the presence of a check valve 23, but it is delivered into a chamber, from which the pump discharges it through the screen or other separating device 2. Furthermore the check valve 5 prevents the accumulated foreign matter in the separating or screening device from being pumped back into the inlet pipe 1, and the check valve 26 prevents the discharged liquid and other substances from flowing back into the separating device or strainer whenever they have been ejected or discharged therefrom.

While the invention has been shown and described in connection with a sewage apparatus, it is to be understood that its use is not limited thereto, as it may be employed in many other situations where liquid and more or less solid substances are to be pumped and where it is desired to prevent said more or less solid substances from entering the pump.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In an apparatus for pumping liquids containing more or less solid substances, the combination of a separator having an inlet opening arranged to be connected with the liquid inlet pipe and having means for restraining the flow of solid substances, and through which means the liquids flow toward and from an outlet opening in said separator, and said separator having a discharge outlet, an intermittently operating pump, a conduit leading from said outlet opening of the separator to the inlet side of the pump, a liquid receiving chamber interposed in said conduit, a valve controlled discharge conduit leading from the discharge side of said pump to said first mentioned conduit, and a discharge pipe leading from said discharge outlet of said separator.

2. In an apparatus for pumping liquids containing more or less solid substances, the combination of a separator having an inlet opening arranged to be connected with the liquid supply pipe, and having means for restraining the flow of solid substances, and through which means the liquids flow toward and from an outlet opening in said separator, and said separator having a discharge opening, a motor operated pump, a conduit leading from said outlet opening of the separator to the inlet side of the pump, a liquid receiving chamber interposed in said conduit, an electric motor-controlling switch operated by the action of the liquid in said chamber, and operating to intermittently open and close the circuit to said motor, a valve controlled discharge conduit leading from the discharge side of the pump to said outlet opening of said separator, and a discharge conduit leading from the discharge opening of said separator.

3. In an apparatus for pumping liquids containing more or less solid substances, the combination of a separator having an inlet opening arranged to be connected with the liquid supply pipe and having a screen for intercepting the solid substances, and through which screen the liquids flow toward and from an outlet opening in said separator, and said separator having a discharge opening, a motor operated pump, a conduit leading from said outlet opening of the separator to the inlet side of the pump, a liquid receiving chamber interposed in said conduit, an electric motor-controlling switch operated by the action of the liquid in said chamber, and operating to intermittently open and close the circuit to said motor, a valve controlled discharge conduit leading from the discharge side of the pump to said outlet opening of said separator, and a discharge conduit leading from the discharge opening of said separator.

4. In an apparatus for pumping liquids containing more or less solid substances, the combination of a separator having an inlet opening arranged to be connected with the source of liquid supply, and a discharge opening arranged to be connected to a discharge conduit, said separator having means for restraining the flow of solid substances and through which means the liquids flow toward and from an outlet opening in the separator, an intermittently acting, motor-operated pump, a conduit leading from said outlet opening of the separator to the inlet side of the pump, a liquid receiving chamber interposed in said conduit, a motor-controlling switch, operated by the action of the liquid in said chamber, to open and close the circuit to said motor, and a valve controlled discharge conduit leading from the discharge side of the pump to said outlet opening of the separator.

5. In an apparatus for pumping liquids containing more or less solid substances, the combination of a separator having an inlet opening arranged to be connected with the source of liquid supply, and a discharge opening arranged to be connected to a discharge conduit, said separator having means for restraining the flow of solid substances and through which means the liquids flow toward and from an outlet opening in the separator, an intermittently acting, motor-operated pump, a conduit leading from said outlet opening in the separator to the inlet side of the pump, a liquid receiving chamber interposed in said conduit, a float operated switch for starting and stopping said motor, the float of said float operated switch being contained in said chamber and acted upon by the rise and fall of liquid therein, and a valve controlled discharge conduit leading from the discharge side of said pump to said outlet opening of the separator.

6. In an apparatus for pumping liquids containing more or less solid substances, the combination of a separator having an inlet opening arranged to be connected with the source of liquid supply, and a discharge opening arranged to be connected to a discharge conduit, said separator having means for restraining the flow of solid substances and through which means the liquids flow toward and from an outlet opening in the separator, and intermittently acting, motor-operated pump, a valve controlled conduit leading from said outlet opening of the separator to the inlet side of the pump, a liquid receiving chamber interposed in said conduit, a motor controlling switch, operated by the action of the liquid in said chamber, to open and close the circuit to said motor, and a discharge conduit leading from the discharge side of the pump to said outlet opening of the separator.

7. In an apparatus for pumping liquids containing more or less solid substances, the combination of a separator having an inlet opening arranged to be connected with the source of liquid supply, and a discharge opening arranged to be connected to a discharge conduit, said separator having means for restraining the flow of solid substances and through which means the liquids flow toward and from an outlet opening in the separator, an intermittently acting, motor-operated pump, a float valve controlled conduit, leading from said outlet opening of the separator to the inlet side of the pump, a liquid receiving chamber interposed in said conduit, a float operated switch for starting and stopping said motor, the float of said float operated switch being contained in said chamber and acted upon by the rise and fall of liquid therein, and a valve controlled discharge conduit leading from the discharge side of said pump to said outlet opening of the separator.

8. In an apparatus for pumping liquids containing more or less solid substances, the combination of a separator having an inlet opening arranged to be connected with the source of liquid supply, and a discharge opening arranged to be connected to a discharge conduit, said separator having means for restraining the flow of solid substances and through which means the liquids flow toward and from an outlet opening in the separator, an intermittently acting, motor-operated pump, a conduit leading from said outlet opening of the separator to the inlet side of the pump, a liquid receiving chamber interposed in said conduit, a valve between said conduit and chamber, a motor controlling switch, said valve and switch being operated by the action of the liquid in the chamber, to open and close the circuit to the motor, and a discharge conduit leading from the discharge side of the pump to said outlet opening of the separator.

9. In an apparatus for pumping liquids containing more or less solid substances, the combination of a separator having an inlet opening arranged to be connected to the source of liquid supply, and a discharge opening arranged to be connected to a discharge pipe, said separator having a screen for intercepting the solid substances, and through which screen the liquid flows to and from an outlet opening in said separator, a motor operated pump, a conduit leading from said outlet opening of the separator to the inlet side of the pump, a liquid receiving chamber interposed in said conduit, a float controlled valve between said conduit and chamber, a float operated, motor-controlling switch for starting and stopping the motor of the pump, the float of said valve and switch being contained in the said liquid receiving chamber and acted upon by the rise and fall of liquid therein, and a discharge conduit leading from the discharge side of said pump to said outlet opening of the separator.

10. In apparatus for pumping liquids containing more or less solid substances, a separating device comprising a chambered case having an inlet opening, an outlet opening and a discharge opening, and a screening member interposed between said inlet and outlet openings, said discharge opening being on the same side of the screening member as the inlet opening.

11. In apparatus for pumping liquids containing more or less solid substances, a separating device comprising a chambered case having an inlet opening and a discharge opening at one side, and an outlet opening at the other side, and a screening member interposed between said outlet opening and the inlet and discharge openings.

AUGUSTUS C. DURDIN, Jr.